(12) United States Patent
Horikawa et al.

(10) Patent No.: US 11,421,811 B2
(45) Date of Patent: Aug. 23, 2022

(54) HERMETICALLY SEALING DEVICE AND HERMETICALLY SEALING METHOD

(71) Applicant: Waterworks Technology Development Organization Co., Ltd., Osaka (JP)

(72) Inventors: Gou Horikawa, Osaka (JP); Syuhei Azuma, Osaka (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 515 days.

(21) Appl. No.: 16/493,671

(22) PCT Filed: Mar. 15, 2017

(86) PCT No.: PCT/JP2017/010425
§ 371 (c)(1),
(2) Date: Sep. 12, 2019

(87) PCT Pub. No.: WO2018/167874
PCT Pub. Date: Sep. 20, 2018

(65) Prior Publication Data
US 2020/0011470 A1    Jan. 9, 2020

(51) Int. Cl.
*F16L 55/168* (2006.01)
(52) U.S. Cl.
CPC .................... *F16L 55/168* (2013.01)
(58) Field of Classification Search
CPC .................................................. F16L 55/168
See application file for complete search history.

(56) References Cited

U.S. PATENT DOCUMENTS 3,602,634 A * 8/1971 Meuli ............... H01L 21/50
257/710
3,963,054 A * 6/1976 Martin ............... F16L 55/10
138/89

(Continued)

FOREIGN PATENT DOCUMENTS

CN    103906961 A    7/2014
CN    109114351 A *  1/2019    .......... F16L 55/1612

(Continued)

OTHER PUBLICATIONS

Extended European Search Report for European Application No. EP17 90 0792, dated Jul. 8, 2020 in 8 pages.

(Continued)

*Primary Examiner* — Kevin R Barss
(74) *Attorney, Agent, or Firm* — Knobbe, Martens, Olson & Bear, LLP (57) ABSTRACT

A hermetically sealing device has a sealing main-body and a rubber seal adhered to the sealing main-body. The rubber seal includes an inner lip, a slit and an outer lip. The inner lip extends along a periphery of the bored opening, and includes an outer-circumference surface that extends forward and inclines toward an inner-circumference side. The slit is formed on an outer-circumference side relative to the inner lip. An outer-surface-side edge of the bored opening enters the slit. The outer lip is formed on an outer-circumference side relative to the slit that is formed on an outer-circumference side relative to the inner lip, and transforms in such a manner that the outer lip extends toward an outer-circumference side to be hermetically in contact with an outer surface of the periphery of the bored opening.

8 Claims, 6 Drawing Sheets

(56) References Cited

U.S. PATENT DOCUMENTS

| | | | |
|---|---|---|---|
| 5,870,799 A | 2/1999 | Benda | |
| 5,996,542 A * | 12/1999 | Bathurst | F16J 15/4476 277/351 |
| 9,989,162 B2 * | 6/2018 | Loveless | G05D 7/0635 |
| 11,292,639 B2 * | 4/2022 | Baracca | F16C 35/00 |
| 2004/0188948 A1 * | 9/2004 | Lang | F16J 1/008 277/436 |
| 2015/0234391 A1 * | 8/2015 | Sabadin | F16K 3/085 137/486 |
| 2021/0244247 A1 * | 8/2021 | Nieschwitz | A47L 5/38 |

FOREIGN PATENT DOCUMENTS

| | | |
|---|---|---|
| DE | 1775561 A1 | 7/1971 |
| DE | 29918122 U1 | 1/2000 |
| DE | 69616490 T2 | 5/2002 |
| JP | 3035600 U | 3/1977 |
| JP | H07-113489 A | 5/1995 |
| JP | 2001-139053 A | 5/2001 |
| JP | 2002-087328 A | 3/2002 |
| JP | 2009074650 A | 4/2009 |
| JP | 2010-96241 A | 4/2010 |
| JP | 2010-117029 A | 5/2010 |
| JP | 2014-134223 A | 7/2014 |
| JP | 2017-141847 A | 8/2017 |

OTHER PUBLICATIONS

Japanese Office Action for Application No. 2016-021539, dated Aug. 19, 2019 in 8 pages (English translation included).
International Search Report for PCT Application No. PCT/JP2017/010425, dated May 30, 2017 in 2 pages.
Japanese Office Action for Application No. 2019-505587, dated Dec. 10, 2019 in 8 pages (English translation included).
PCT IPRP for Application No. PCT/JP2017/010425, dated Sep. 26, 2019 in 7 pages.
Chinese Office Action issued for Chinese Patent Application No. 201780087066.0, dated Mar. 3, 2021 in 21 pages including English translation.
Japanese Office Action for Application No. 2016-021539, dated Nov. 21, 2019 in 8 pages (English translation included).
Chinese Office Action for Chinese Patent Application No. 201780087066.0, dated Jul. 1, 2020 in 13 pages including English Translation.

* cited by examiner

HERMETICALLY SEALING DEVICE AND HERMETICALLY SEALING METHOD

CROSS-REFERENCE TO RELATED APPLICATIONS

This application is the U.S. National Phase under 35. U.S.C. § 371 of International Application PCT/JP2017/010425, filed Mar. 15, 2017. The disclosures of which including the specification, the drawings, and the claims is hereby incorporated by reference in its entirety. Japanese Patent Application No. 2016-021539 is another prior foreign application for which priority is not claimed. The entire disclosure of this prior foreign application is also incorporated by reference in its entirety.

TECHNICAL FIELD

The present invention relates to a hermetically sealing device and a hermetically sealing method of hermetically sealing a bored opening bored through a side of a fluid pipe.

BACKGROUND ART

Considering convenience of water-supply users, under pressure construction method that can be performed while water is running is useful to replace an existing water main (an example of fluid pipe). As under pressure construction method, a technique of connecting a gate valve to a middle of an existing water main, and connecting a branch pipe to the gate valve to form a bypass is known. After work that uses the technique has been finished, only the branch pipe is conventionally removed and the gate valve is left. Therefore, heavy equipment may hit the gate valve when the heavy equipment excavates the same place in the future.

Therefore, it is preferable that both the branch pipe and the gate valve are removed in the work. For that purpose, hermetical sealing needs to be performed while water is running. Patent Documents 1 and 2 each disclose a technique of hermetically sealing a branch portion of a T-shaped pipe while water is running, and removing the branch pipe with a gate valve. These techniques each simply, reliably, hermetically seal the branch portion of the T-shaped pipe. However, a bayonet groove needs to be formed on an inner surface of the branch portion of the T-shaped pipe. Therefore, the techniques are not general-purpose.

Patent Document 3 discloses a hermetically sealing device that hermetically seals a bored opening bored through a side of a fluid pipe. Considering decrease in cost, a hermetically sealing device that has simpler configuration may be desired. Further, the bored opening may be slightly misaligned. Therefore, in work of hermetically sealing the bored opening, the hermetically sealing device tends to be accurately positioned when the hermetically sealing device is attached. A central axis of the hermetically sealing device particularly tends to be accurately aligned with a central axis of the bored opening (adjustment of a central position) when the hermetically sealing device is attached. Further, when the hermetically sealing device that has been attached is fixed, misalignment of the hermetically sealing device needs to be avoided.

PRIOR ART DOCUMENTS

Patent Documents

Patent Document 1: JP-A-2010-96241
Patent Document 2: JP-A-2010-117029
Patent Document 3: JP-A-2014-134223

SUMMARY OF THE INVENTION

Problems to be Solved by the Invention

In light of the circumstances described above, the present invention is made. An object of the present invention is to provide a hermetically sealing device that hermetically seals a bored opening, has simple configuration, positions the hermetically sealing device when the hermetically sealing device is attached, and does not allow misalignment of the hermetically sealing device when the hermetically sealing device is attached, and to provide a hermetically sealing method.

Means for Solving the Problems

The object can be achieved by the following present invention. That is, the present invention provides a hermetically sealing device attached to a bored opening bored through a side of a fluid pipe, the hermetically sealing device comprising, a sealing main-body, and a rubber seal adhered to the sealing main-body, wherein the rubber seal includes an inner lip that extends along a periphery of the bored opening, and includes an outer-circumference surface that extends forward and inclines toward an inner-circumference side, a slit that is formed on an outer-circumference side relative to the inner lip and where an outer-surface-side edge of the bored opening enters, and an outer lip that is formed on an outer-circumference side relative to the slit that is formed on an outer-circumference side relative to the inner lip, and transforms in such a manner that the outer lip extends toward an outer-circumference side to be hermetically in contact with an outer surface of the periphery of the bored opening.

In the hermetically sealing device, the outer-surface-side edge of the bored opening enters the slit of the rubber seal. Therefore, the inner lip formed on an inner-circumference side relative to the slit is inserted into the bored opening, and the outer lip formed on an outer-circumference side relative to the slit is hermetically in contact with the outer surface of the periphery of the bored opening. When the hermetically sealing device is strongly pressed against the bored opening while the outer-surface-side edge of the bored opening is in the slit, the inner lip is drawn toward an end-surface side of the bored opening. Consequently, the rubber seal hermetically seals an end surface of the bored opening and the outer surface of the periphery of the bored opening.

The outer-circumference surface of the inner lip extends forward and inclines toward an inner-circumference side. Therefore, the inner lip is appropriately inserted into the bored opening even if the bored opening is slightly misaligned. Consequently, a central axis of a boring device is aligned with a central axis of the bored opening (adjustment of a central position). Further, the inner lip and the outer lip sandwich the outer-surface-side edge of the bored opening. Therefore, when the hermetically sealing device that has been attached is fixed, misalignment of the hermetically sealing device is not allowed. Therefore, the hermetically sealing device has simple configuration, positions the hermetically sealing device when the hermetically sealing device is attached, and does not allow misalignment of the hermetically sealing device when the hermetically sealing device is attached.

It is preferable that the rubber seal includes a groove that is formed on an inner-circumference side relative to the inner lip. Consequently, a space is formed into which the inner lip curves toward an inner-circumference side. Therefore, the inner lip is not sandwiched between an outer surface of the periphery of the bored opening and the outer lip, and thus is appropriately inserted into the bored opening. The configuration is useful particularly if the bored opening is slightly misaligned.

It is preferable that the rubber seal includes rear rubber that is disposed behind the outer lip and is made of rubber that is harder than the outer lip. Consequently, the outer lip is sufficiently pressed against the outer surface of the periphery of the bored opening. Further, the outer lip is less likely to deform even if water pressure acts on the rubber seal. Therefore, hermetically-sealing performance is improved.

It is preferable that an outer-circumference surface of the rubber seal is an inclined surface that inclines relative to an attachment direction. When the hermetically sealing device is moved closer to the bored opening through a pipe, the configuration decreases resistance due to contact with the inside of the pipe, and thus improves workability.

It is preferable that the outer lip viewed from an axial direction of the fluid pipe protrudes more forward than the inner lip. Therefore, hermetically-sealing performance is improved.

It is preferable that a side surface of the sealing main-body is lined with a rubber lining. When the hermetically sealing device is strongly pressed against the bored opening, the configuration does not allow the outer lip that transforms in such a manner that the outer lip extends to turn inside out. Therefore, hermetically-sealing performance is appropriately obtained.

Further, the present invention provides a hermetically sealing method of attaching a hermetically sealing device to a bored opening bored through a side of a fluid pipe, the hermetically sealing method comprising a step that presses, against the bored opening, a hermetically sealing device that includes a sealing main-body, and a rubber seal that is adhered to the sealing main-body and includes an inner lip and an outer lip, to insert the inner lip that includes an outer-circumference surface that extends forward and inclines toward an inner-circumference side into the bored opening, to make an outer-surface-side edge of the bored opening enter a slit formed between the inner lip and the outer lip, and to make the outer lip transform in such a manner that the outer lip extends toward an outer-circumference side to be hermetically in contact with an outer surface of a periphery of the bored opening.

In the hermetically sealing method, the outer-surface-side edge of the bored opening is made to enter the slit of the rubber seal, the inner lip formed on an inner-circumference side relative to the slit is inserted into the bored opening, and the outer lip formed on an outer-circumference side relative to the slit is made to be hermetically in contact with the outer surface of the periphery of the bored opening. When the hermetically sealing device is strongly pressed against the bored opening while the outer-surface-side edge of the bored opening is in the slit, the inner lip is drawn toward an end-surface side of the bored opening. Consequently, the rubber seal hermetically seals an end surface of the bored opening and the outer surface of the periphery of the bored opening.

The outer-circumference surface of the inner lip extends forward and inclines toward an inner-circumference side. Therefore, the inner lip is appropriately inserted into the bored opening even if the bored opening is slightly misaligned. Consequently, a central axis of a boring device is aligned with a central axis of the bored opening (adjustment of a central position). Further, the inner lip and the outer lip sandwich the outer-surface-side edge of the bored opening. Therefore, when the hermetically sealing device that has been attached is fixed, misalignment of the hermetically sealing device is not allowed. Therefore, the hermetically sealing device has simple configuration, positions the hermetically sealing device when the hermetically sealing device is attached, and does not allow misalignment of the hermetically sealing device when the hermetically sealing device is attached.

If the inner lip is made to cover a whole end surface of the bored opening, the rubber seal of the hermetically sealing device protects the end surface of the bored opening against corrosion.

BRIEF DESCRIPTION OF THE DRAWINGS

FIGS. 3(a) to 3(c) illustrate three surfaces of the hermetically sealing device, respectively.

MODE FOR CARRYING OUT THE INVENTION

An embodiment of the present invention will be explained with reference to the drawings. The present embodiment shows an example in which a hermetically sealing device is attached to a bored opening bored through a side of a water main as an example of fluid pipe.

Figure 1:
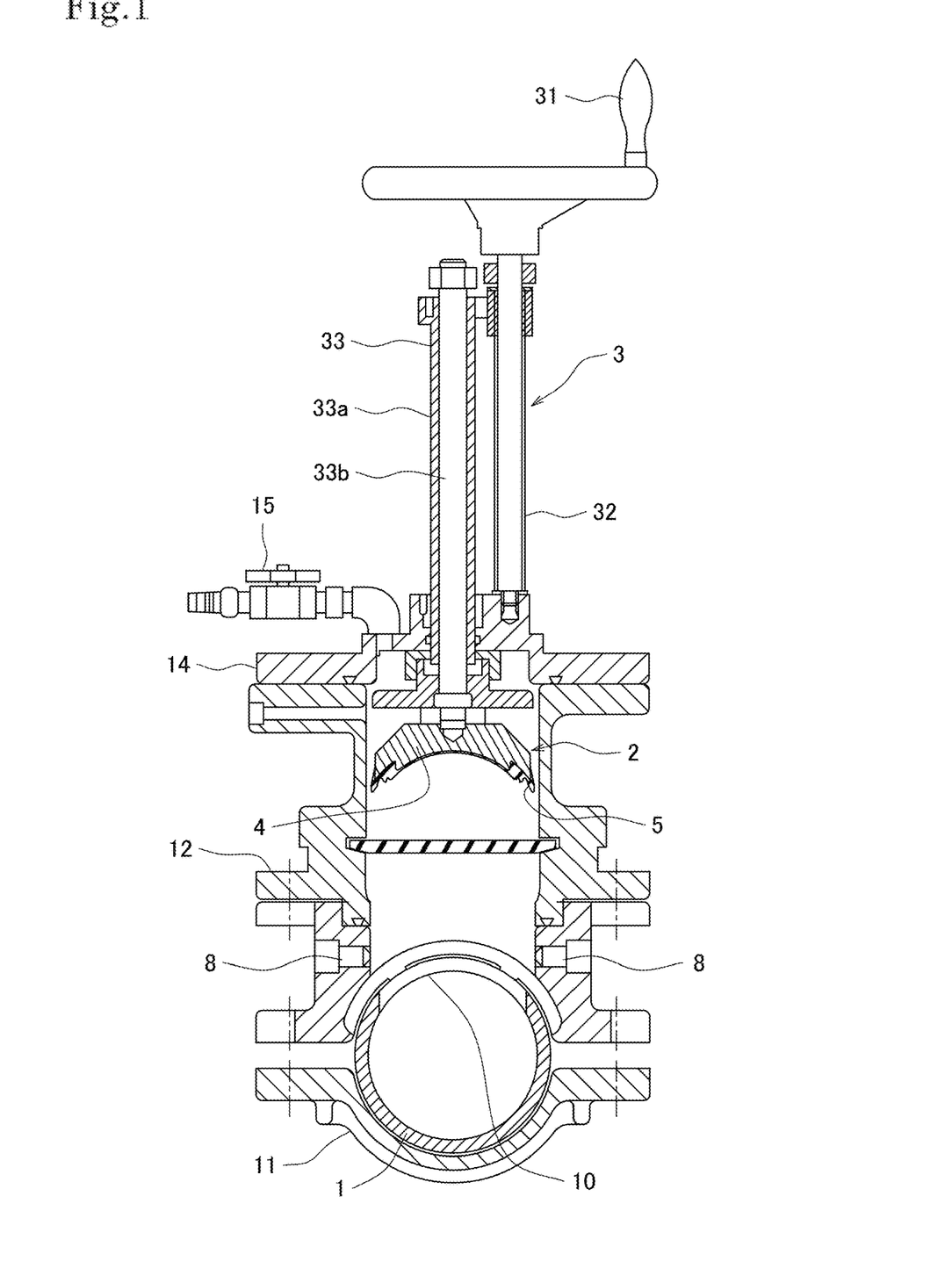
FIG. 1 is a cross-sectional view that illustrates condition before attachment of a hermetically sealing device to a bored opening.

A water main 1 illustrated in FIG. 1 constitutes part of water pipeline. A tapping sleeve 11 surrounds the water main 1. A bored opening 10 is bored through a side of the water main 1. The bored opening 10 faces upward. The bored opening 10 is bored using under pressure construction method. More specifically, the bored opening 10 is bored in a process in which a branch pipe is connected to the water main 1 to form a bypass. A gate valve 12 is between the branch pipe and the water main 1. In FIG. 1, a necessary work (e.g. replacement of a water main) has been finished, and the branch pipe has been removed. Then, while water is running, the bored opening 10 is hermetically sealed, and the gate valve 12 is removed.

The gate valve 12 is connected to the tapping sleeve 11. A lid member 14 hermetically closes an end of the gate valve 12. A hermetically sealing device 2 is at an end of an operational tool 3 and is within the gate valve 12. The operational tool 3 is configured to move the hermetically sealing device 2 along an attachment direction. In the present description, the attachment direction is a direction along which the hermetically sealing device 2 is moved to be attached. That is, the attachment direction is a vertical direction in FIG. 1. A forward direction indicates a forward direction of the attachment direction, that is a downward direction in FIG. 1. A rearward direction indicates a rearward direction of the attachment direction, that is an upward direction in FIG. 1.

Figure 2:
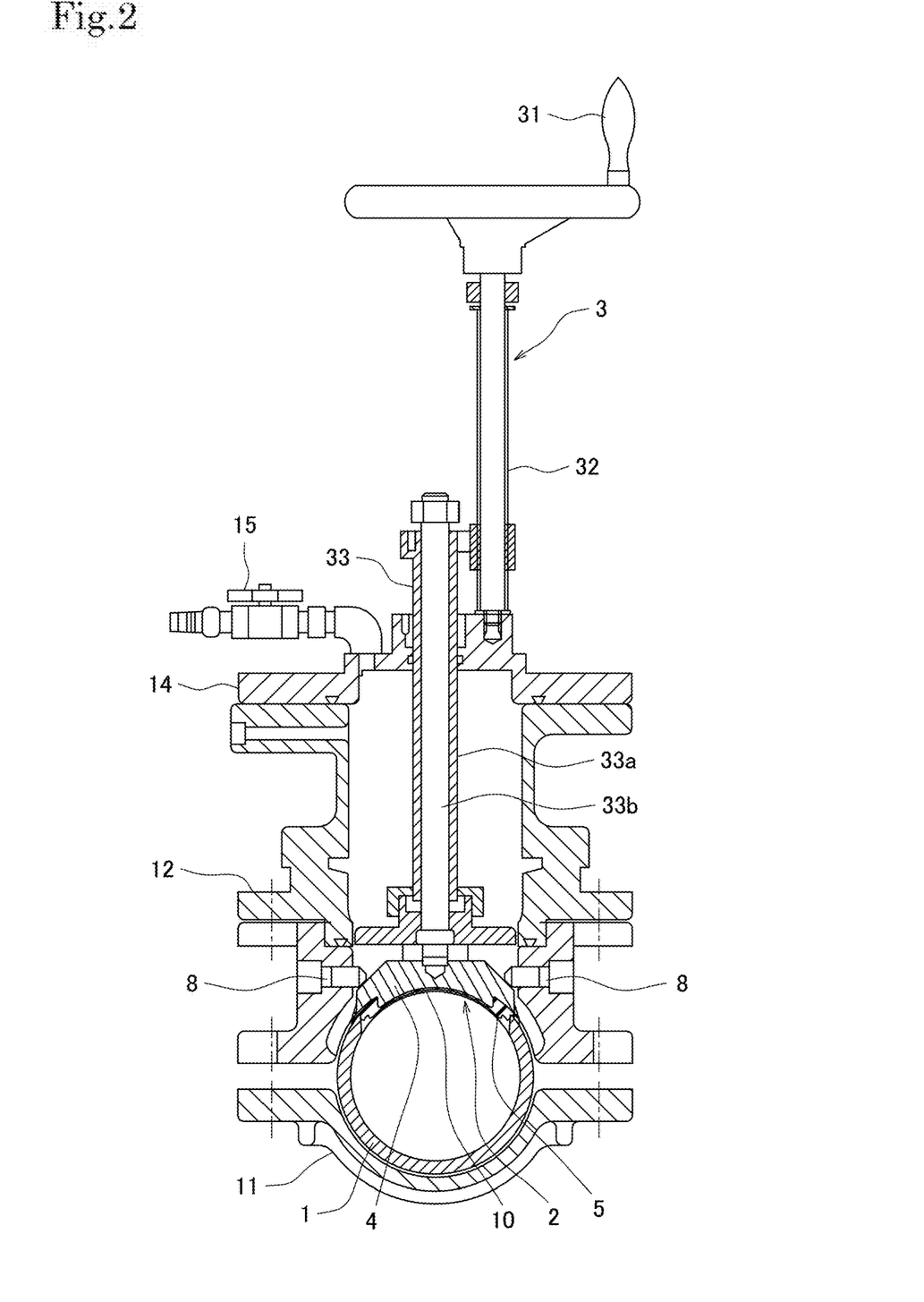
FIG. 2 is a cross-sectional view in which the hermetically sealing device is pressed against the bored opening.

The operational tool 3 includes a fixed shaft 32 rotated by operating a handle 31, and a movable shaft 33 that penetrates the lid member 14 and is slidably supported. The movable shaft 33 is moved up or down by rotation of the fixed shaft 32. The movable shaft 33 includes a tube 33a, and an internal shaft 33b inserted in the tube 33a. A front end of the internal shaft 33b protrudes from the tube 33a. A male screw is formed at the front end, and screws into the hermetically sealing device 2. The operational tool 3 is used to press the hermetically sealing device 2 against the bored opening 10, as illustrated in FIG. 2.

The bored opening 10 may be slightly misaligned due to vibration during boring. For example, a central axis of the bored opening 10 may be misaligned with a central axis of a branch portion of the tapping sleeve 11 and the gate valve 12 (misalignment of a central position). Therefore, the hermetically sealing device 2 tends to be accurately positioned when the hermetically sealing device 2 is attached. A central axis of the hermetically sealing device 2 particularly tends to be accurately aligned with a central axis of the bored opening 10 (adjustment of a central position) when the hermetically sealing device 2 is attached. To block water, the hermetically sealing device 2 does not enter the water main 1 through the bored opening 10, but is pressed against a surface around the bored opening 10. Therefore, a central axis of the hermetically sealing device 2 tends to be more accurately aligned with a central axis of the bored opening 10. Further, when the hermetically sealing device 2 is fixed, misalignment of the hermetically sealing device 2 needs to be avoided. Therefore, the hermetically sealing device 2 is configured as described below to position the hermetically sealing device 2 when the hermetically sealing device 2 is attached, and not to allow misalignment of the hermetically sealing device 2 when the hermetically sealing device 2 is attached.

Figure 3:
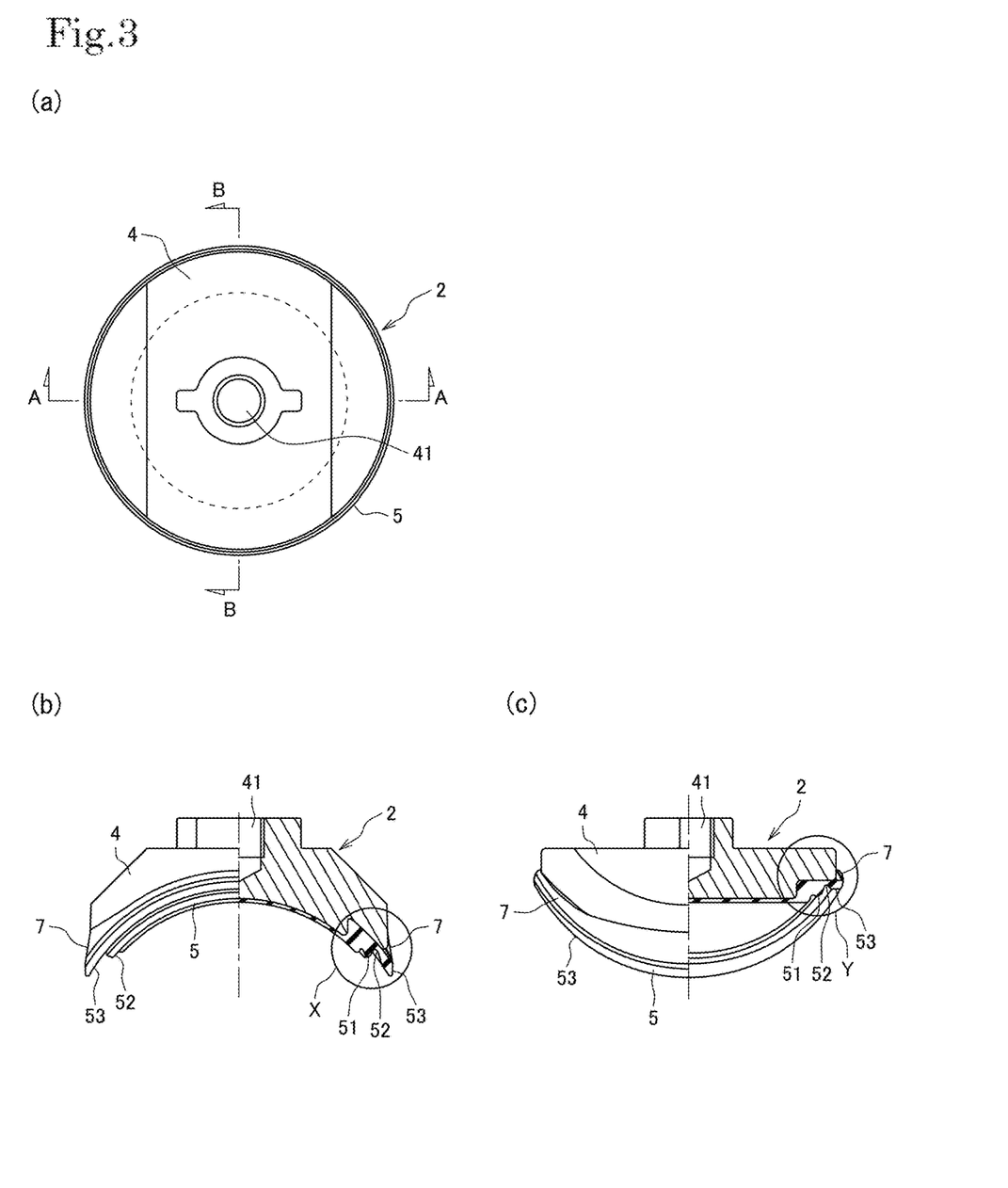
FIG. 3(a) is a top view of the hermetically sealing device.
FIG. 3(b) is a front half cross section of the hermetically sealing device.
FIG. 3(c) is a side half cross section of the hermetically sealing device.
Figure 4:
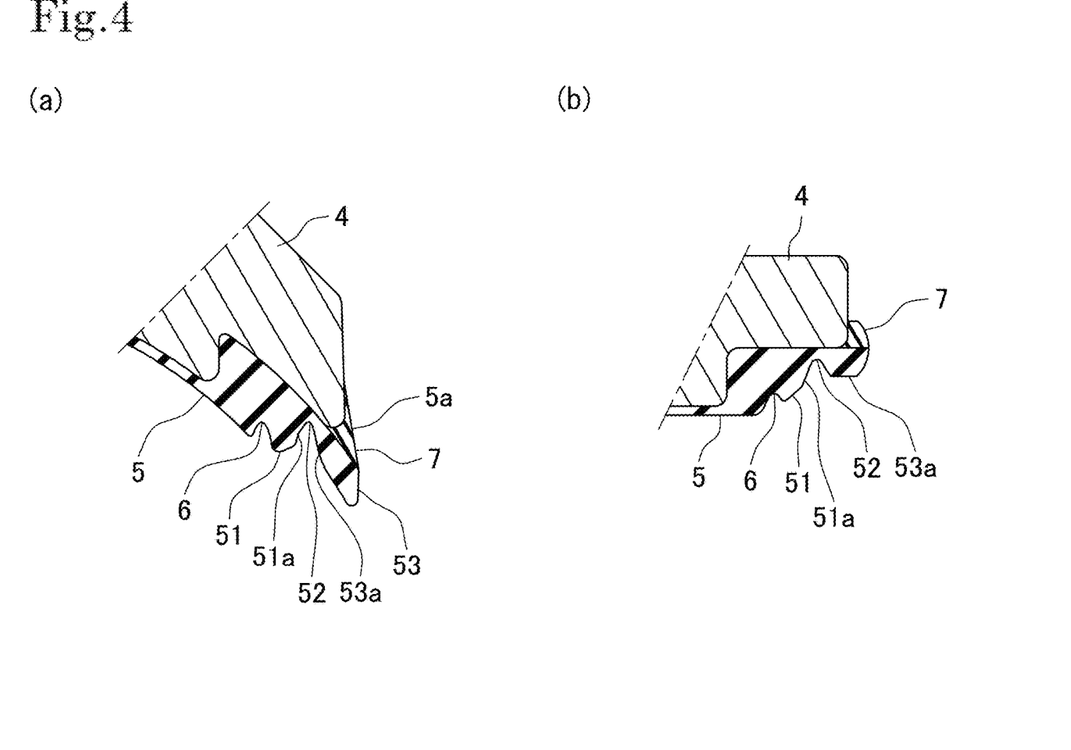
FIG. 4(a) is a front cross-sectional view that illustrates main part of the hermetically sealing device.
FIG. 4(b) is a side cross-sectional view that illustrates main part of the hermetically sealing device.

FIGS. 3(a) to 3(c) illustrate three surfaces of the hermetically sealing device 2, respectively. A half cross section in FIG. 3(b) corresponds to a half cross section viewed along arrows A-A. A half cross section in FIG. 3(c) corresponds to a half cross section viewed along arrows B-B. FIG. 4(a) is an enlarged view of portion X in FIG. 3(b). FIG. 4(b) is an enlarged view of portion Y in FIG. 3(c). The hermetically sealing device 2 includes a sealing main-body 4, and a rubber seal 5 adhered to the sealing main-body 4. The hermetically sealing device 2 as a whole has a disk-like shape that has a curved front surface. The sealing main-body 4 is made of rigid body, such as metal. A front of the sealing main-body 4 is lined with the rubber seal 5. Attachment portion 41 is formed at a rear of the sealing main-body 4.

The operational tool 3 is attached to or removed from the attachment portion 41. In the present embodiment, a female screw is formed at the attachment portion 41. The front end of the internal shaft 33b screws into the female screw.

The rubber seal 5 includes an inner lip 51 that extends along a periphery of the bored opening 10, a slit 52 that is formed on an outer-circumference side relative to the inner lip 51 and where an outer-surface-side edge of the bored opening 10 enters, and an outer lip 53 that is formed on an outer-circumference side relative to the slit 52 that is formed on an outer-circumference side relative to the inner lip 51, and transforms in such a manner that the outer lip 53 extends toward an outer-circumference side to be hermetically in contact with an outer surface of the periphery of the bored opening 10. In the present embodiment, the rubber seal 5 covers the whole front surface of the sealing main-body 4. However, an annular portion of the rubber seal 5 that is opposite the periphery of the bored opening 10 hermetically seals a gap between the hermetically sealing device 2 and the bored opening 10. The inner lip 51 and the outer lip 53 extend annularly along the annular portion while curving.

The slit 52 is an annular groove that is recessed rearward. The inner lip 51 and the outer lip 53 protrude forward from a bottom of the slit 52. The inner lip 51 includes an outer-circumference surface 51a that extends forward and inclines toward an inner-circumference side. The outer lip 53 includes an inner-circumference surface 53a that extends forward and inclines toward an outer-circumference side. The outer lip 53 viewed from an axial direction of the water main 1 tapers forward, as illustrated in FIG. 4(a). The outer lip 53 viewed from the axial direction of the water main 1 protrudes more forward than the inner lip 51. The configuration is useful to improve hermetically-sealing performance.

Figure 5:
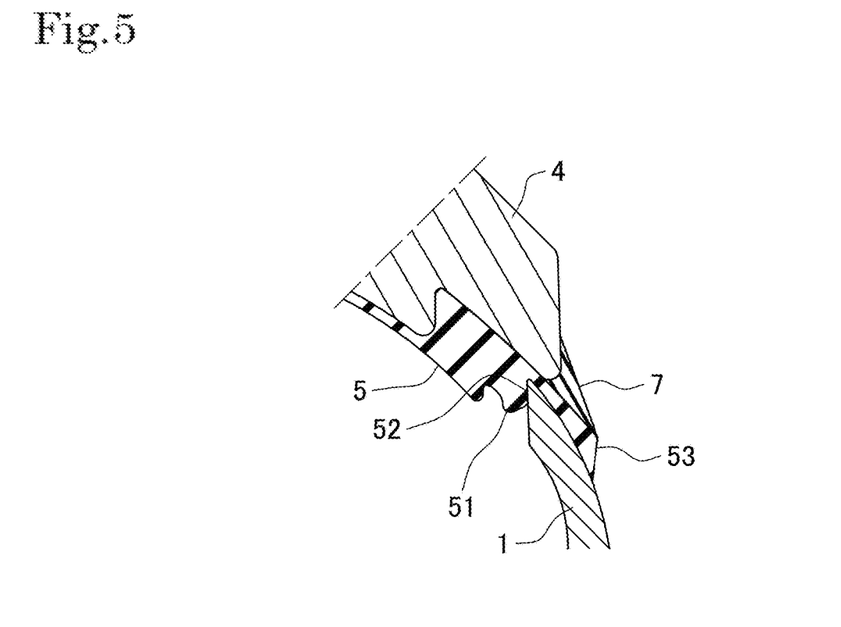
FIG. 5 is a cross-sectional view in which main part of the hermetically sealing device pressed against the bored opening is enlarged.

FIG. 5 illustrates the rubber seal 5 in condition in FIG. 2. As described above, the outer-surface-side edge of the bored opening 10 enters the slit 52, and the outer lip 53 transforms in such a manner that the outer lip 53 extends toward the outer-circumference side to be hermetically in contact with the outer surface of the periphery of the bored opening 10. The inner lip 51 formed on an inner-circumference side relative to the slit 52 is inserted into the bored opening 10. When the hermetically sealing device 2 is strongly pressed against the bored opening 10 while the outer-surface-side edge of the bored opening 10 is in the slit 52, the inner lip 51 is drawn toward an end-surface side of the bored opening 10. Consequently, the rubber seal 5 hermetically seals an end surface of the bored opening 10 and the outer surface of the periphery of the bored opening 10, as illustrated in FIG. 5.

In the hermetically sealing device 2, the outer-circumference surface 51a of the inner lip 51 extends forward and inclines toward an inner-circumference side. Therefore, the inner lip 51 is appropriately inserted even if the bored opening 10 is slightly misaligned. Consequently, a central axis of the hermetically sealing device 2 is aligned with a central axis of the bored opening 10. If the outer-circumference surface 51a does not incline as such, the inner lip 51 may be misaligned and pressed against an outer surface of the water main 1. In the present embodiment, the inner-circumference surface 53a of the outer lip 53 extends forward and inclines toward the outer-circumference side. Therefore, the outer-surface-side edge of the bored opening 10 easily enters the slit 52, and the outer lip 53 smoothly extends toward the outer-circumference side.

In the present embodiment, fastening screws 8 are fixing components that fix the hermetically sealing device 2 pressed against the bored opening 10. The fastening screws 8 screw into through holes bored through the branch portion of the tapping sleeve 11. The hermetically sealing device 2 is not allowed to separate from the bored opening 10 by pressing the fastening screws 8 inside. The fastening screws 8 are in contact with an inclined surface of the sealing main-body 4, and thus press the hermetically sealing device 2 forward. Therefore, when the hermetically sealing device that has been attached to the bored opening 10 is fixed to the bored opening 10, the hermetically sealing device may be misaligned due to twist or rotation of the hermetically sealing device.

In the hermetically sealing device 2, however, the inner lip 51 and the outer lip 53 sandwich the outer-surface-side edge of the bored opening 10, as illustrated in FIG. 5. Therefore, such misalignment is not allowed. Therefore, the hermetically sealing device 2 has simple configuration, positions the hermetically sealing device 2 when the hermetically sealing device 2 is attached, and does not allow misalignment of the hermetically sealing device 2 when the hermetically sealing device 2 is attached. Misalignment due to twist indicates that the hermetically sealing device 2 viewed from an axial direction of the water main 1, as illustrated in FIG. 3(b), inclines downward toward right or inclines downward toward left. Misalignment due to rotation indicates that the hermetically sealing device 2 viewed from the attachment direction, as illustrated in FIG. 3(a), rotates on an axis of the hermetically sealing device 2

In the present embodiment, the rubber seal 5 includes a groove 6 that is formed on the inner-circumference side relative to the inner lip 51. The groove 6 is an annular groove that is recessed rearward. According to such configuration, a space is formed into which the inner lip 51 curves toward an inner-circumference side. Therefore, the inner lip 51 is not sandwiched between an outer surface of the periphery of the bored opening 10 and the outer lip 53, and thus is appropriately inserted into the bored opening 10. The configuration is useful particularly if the bored opening 10 is misaligned.

In the present embodiment, the rubber seal 5 includes rear rubber 7 that is disposed behind the outer lip 53 and is made of rubber that is harder than the outer lip 53. Consequently, force from the sealing main-body 4 is efficiently transferred to the outer lip 53. Consequently, the outer lip 53 is sufficiently pressed against the outer surface of the periphery of the bored opening 10. Further, the outer lip 53 is less likely to deform even if water pressure acts on the rubber seal 5. Therefore, hermetically-sealing performance is improved.

The rear rubber 7 has high rubber hardness than the outer lip 53. The rubber hardness is Japanese Industrial Standard (JIS) A-hardness (a value measured at 25° C. according to hardness test using durometers (type A) of JIS K 6253), for example. For example, the outer lip 53 has a JIS A-hardness of 50°, and the rear rubber 7 has a JIS A-hardness of 70°. In the present embodiment, an interface between the outer lip 53 and the rear rubber 7, viewed from an axial direction of the water main 1, extends forward and inclines toward the outer-circumference side. Due to the shape, the rear rubber 7 effectively yields the effect described above.

An outer-circumference surface 5a of the rubber seal 5 (an outer-circumference surface of the outer lip 53 and an outer-circumference surface of the rear rubber 7) is on an outer-circumference side relative to an outer-circumference surface of the sealing main-body 4. In the present embodiment, the outer-circumference surface 5a of the rubber seal 5 is an inclined surface that inclines relative to the attachment direction. More specifically, the outer-circumference surface of the rear rubber 7 extends forward and inclines toward the outer-circumference side. Further, the outer-circumference surface of the outer lip 53 extends forward and inclines toward an inner-circumference side. Consequently, when the hermetically sealing device 2 is moved closer to the bored opening 10 through a pipe (through an inside of the branch portion of the tapping sleeve 11 and an inside of the gate valve 12), resistance due to contact with the inside of the pipe decreases, and thus workability is improved.

A hermetically sealing method that uses the hermetically sealing device 2 includes a step that presses, against a bored opening 10, a hermetically sealing device 2 that includes a sealing main-body 4, and a rubber seal 5 that is adhered to the sealing main-body 4 and includes an inner lip 51 and an outer lip 53, to insert the inner lip 51 that includes an outer-circumference surface 51a that extends forward and inclines toward an inner-circumference side into the bored opening 10, to make an outer-surface-side edge of the bored opening 10 enter a slit 52 formed between the inner lip 51 and the outer lip 53, and to make the outer lip 53 transform in such a manner that the outer lip 53 extends toward an outer-circumference side to be hermetically in contact with an outer surface of a periphery of the bored opening 10. Hereinafter, a more specific procedure will be described.

First, the hermetically sealing device 2 is attached to the operational tool 3, and the lid member 14 is connected to the gate valve 12, as in FIG. 1. Next, the gate valve 12 is opened to be filled with water. Then the handle 31 is rotated to move the movable shaft 33 forward to press the hermetically sealing device 2 against the bored opening 10, as illustrated in FIG. 2. During that time, the outer-surface-side edge of the bored opening 10 enters the slit 52, and thus the hermetically sealing device 2 is positioned relative to the bored opening 10. The inner lip 51 (the outer-circumference surface 51a of the inner lip 51) guides the hermetically sealing device 2. Therefore, a central axis of the hermetically sealing device 2 is aligned with a central axis of the bored opening 10 even if the bored opening 10 is slightly misaligned.

When the outer-surface-side edge of the bored opening 10 enters the slit 52, the inner lip 51 is inserted into the bored opening 10, and the outer lip 53 transforms in such a manner that the outer lip 53 extends toward the outer-circumference side to become hermetically in contact with an outer surface of the periphery of the bored opening 10. Further, the hermetically sealing device 2 is strongly pressed against the bored opening 10 while the outer-surface-side edge of the bored opening 10 is in the slit 52. Consequently, the inner lip 51 is drawn toward an end-surface side of the bored opening 10. Consequently, the rubber seal 5 hermetically seals an end surface of the bored opening 10 and the outer surface of the periphery of the bored opening 10, as illustrated in FIG. 5.

Then a valve 15 for confirmation of blockage of water is opened to confirm blockage of water. Then the fastening screws 8 are pressed inside. During that time, misalignment of the hermetically sealing device 2 due to twist or rotation is not allowed, as described above. After the hermetically sealing device 2 that has been attached to the bored opening 10 is fixed to the bored opening 10, a rear end of the internal shaft 33b that protrudes from the tube 33a is operated to rotate the internal shaft 33b and unscrew the internal shaft 33b from the hermetically sealing device 2. Since the bored opening 10 is hermetically sealed, the gate valve 12 and the operational tool 3 can be removed if the gate valve 12 is disconnected from the tapping sleeve 11. After the gate valve 12 is removed, a lid is attached to the branch portion of the tapping sleeve 11, as necessary.

Figure 6:
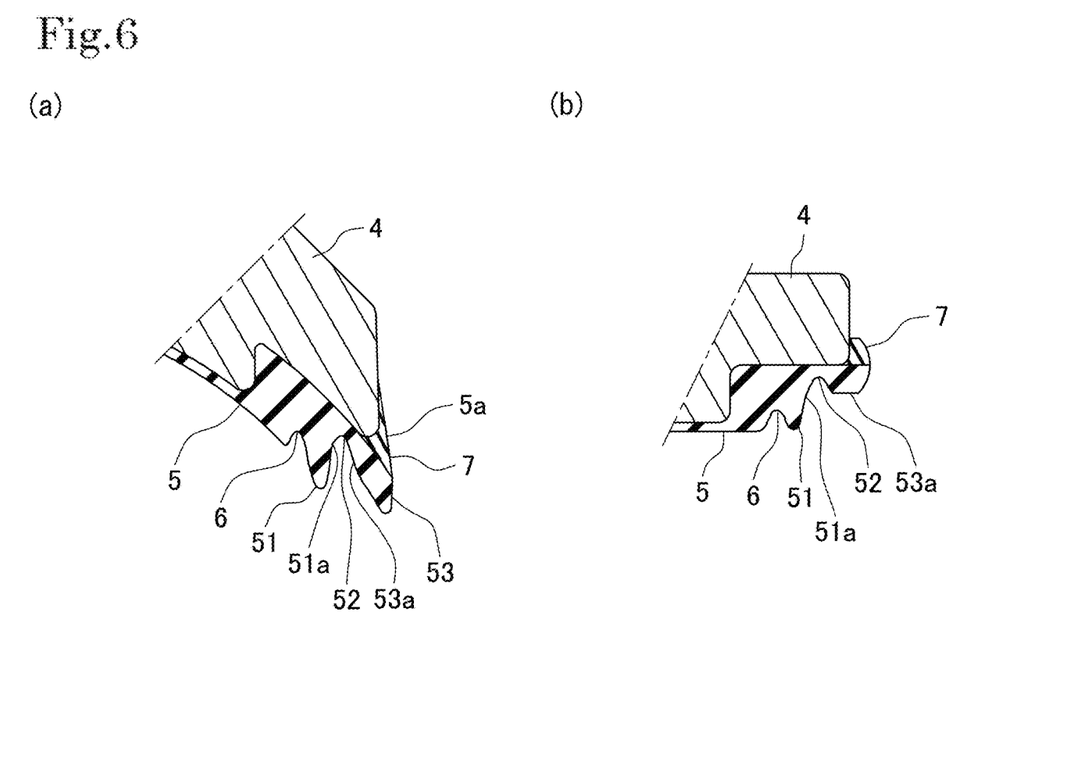
FIG. 6(a) is a front cross-sectional view that illustrates main part of a hermetically sealing device according to another embodiment.
FIG. 6(b) is a side cross-sectional view that illustrates main part of the hermetically sealing device according to the embodiment.
Figure 7:
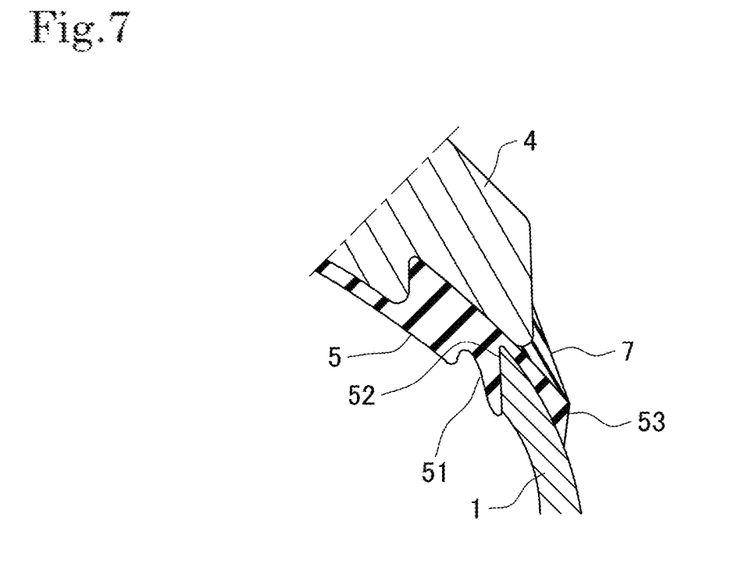
FIG. 7 is a cross-sectional view in which main part of the hermetically sealing device in FIGS. 6(a) and 6(b) pressed against a bored opening is enlarged.

In another embodiment illustrated in FIGS. 6(a) and 6(b), an inner lip 51 protrudes more than the inner lip 51 protrudes in the embodiment described above. Other configuration of the embodiment is similar to the configuration of the embodiment described above. Portions that are the same as the portions described in the embodiment described above are designated the same reference signs. An outer-circumference surface 51a of the inner lip 51 has a length that covers the whole end surface of a bored opening 10. In the present embodiment, the inner lip 51 covers the whole end surface of the bored opening 10, as illustrated in FIG. 7. Therefore, the rubber seal 5 protects the end surface of the bored opening 10 against corrosion.

Figure 8:
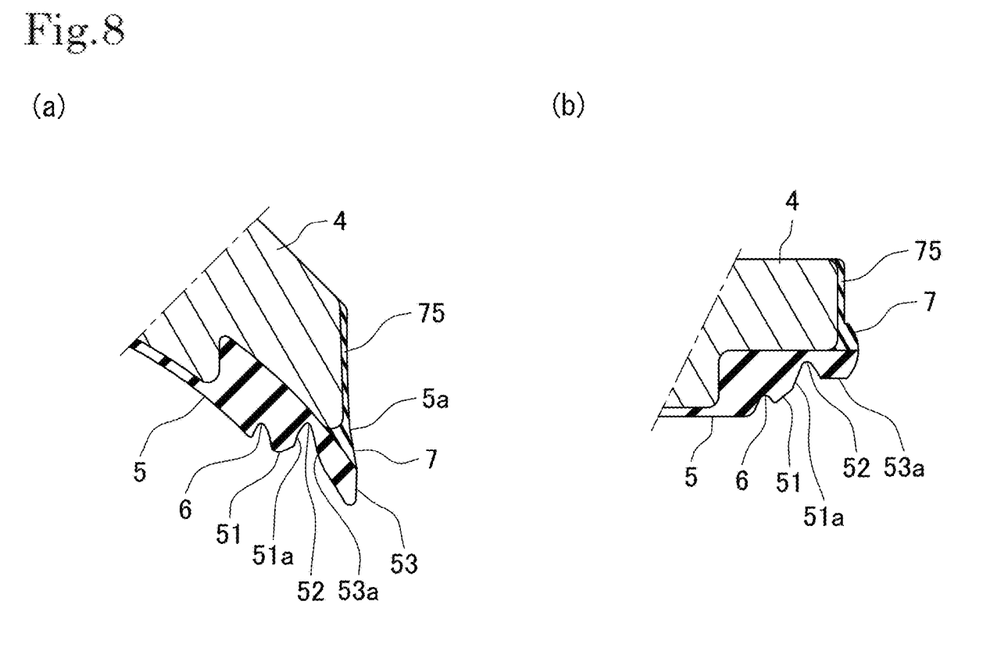
FIG. 8(a) is a front cross-sectional view that illustrates main part of a hermetically sealing device according to another embodiment.
FIG. 8(b) is a side cross-sectional view that illustrates main part of the hermetically sealing device according to the embodiment.
Figure 9:
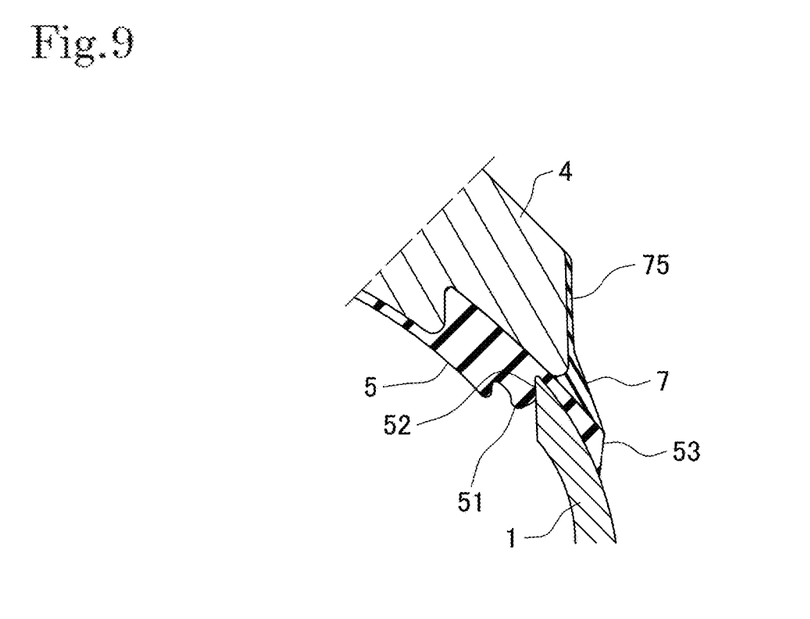
FIG. 9 is a cross-sectional view in which main part of the hermetically sealing device in FIGS. 8(a) and 8(b) pressed against a bored opening is enlarged.

In another embodiment illustrated in FIGS. 8(a) and 8(b) and 9, a side surface of a sealing main-body 4 is lined with a rubber lining. Other configuration of the embodiment is similar to the configuration of the embodiment illustrated in FIGS. 3(a) to 3(c) and 4(a) and 4(b). Portions that are the same as the portions described above are designated the same reference signs. A rubber lining 75 sticks to the whole side surface of the sealing main-body 4. The rubber lining 75 is a film, and is behind and in contact with a rubber seal 5 (is behind and in contact with rear rubber 7 of the rubber seal 5). In the present embodiment, the rubber lining 75 is integral with the rubber seal 5. Further, an outer-circumference surface of the rubber lining 75 is smoothly continuous with an outer-circumference surface 5a of the rubber seal 5. In this way, the side surface of the sealing main-body 4 is lined with the rubber lining. Therefore, when a hermetically sealing device 2 is strongly pressed against a bored opening 10, an outer lip 53 that transforms in such a manner that the outer lip 53 extends is not allowed to turn inside out. Therefore, hermetically-sealing performance is appropriately obtained. The rubber lining may be applied to the embodiment illustrated in FIGS. 6(a) and 6(b).

In addition to removal of a branch pipe in replacement of a water main, a hermetically sealing device and a hermetically sealing method according to an aspect of the present invention may be used to hermetically seal a bored opening of a fluid pipe in other circumstances. A fluid pipe is not limited to a water main, and may be a fluid pipe used for fluids such as various types of liquids and gas other than water.

The present invention is not limited to the embodiments described above. Various modification and variation are possible without departing from the spirit of the present invention.

DESCRIPTION OF REFERENCE SIGNS 1 water main (an example of fluid pipe)
2 hermetically sealing device
3 operational tool
4 sealing main-body
5 rubber seal
6 groove
7 rear rubber
8 fastening screw
10 bored opening
11 tapping sleeve
12 gate valve
51 inner lip
52 slit
53 outer lip

What is claimed is:

1. A hermetically sealing device attached to a bored opening bored through a side of a fluid pipe, the hermetically sealing device comprising:
   a sealing main-body; and
   a rubber seal adhered to the sealing main-body, wherein the rubber seal includes:
      an inner lip that extends along a periphery of the bored opening, and includes an outer-circumference surface that extends forward and inclines toward an inner-circumference side;
      a slit that is formed on an outer-circumference side relative to the inner lip and where an outer-surface-side edge of the bored opening enters; and
      an outer lip that is formed on an outer-circumference side relative to the slit that is formed on an outer-circumference side relative to the inner lip, and transforms in such a manner that the outer lip extends toward an outer-circumference side to be hermetically in contact with an outer surface of the periphery of the bored opening.

2. The hermetically sealing device according to claim 1, wherein the rubber seal includes a groove that is formed on an inner-circumference side relative to the inner lip.

3. The hermetically sealing device according to claim 1, wherein the rubber seal includes rear rubber that is disposed behind the outer lip and is made of rubber that is harder than the outer lip.

4. The hermetically sealing device according to claim 1, wherein an outer-circumference surface of the rubber seal is an inclined surface that inclines relative to an attachment direction.

5. The hermetically sealing device according to claim 1, wherein the outer lip viewed from an axial direction of the fluid pipe protrudes more forward than the inner lip.

6. The hermetically sealing device according to claim 1, wherein a side surface of the sealing main-body is lined with a rubber lining.

7. A hermetically sealing method of attaching a hermetically sealing device to a bored opening bored through a side of a fluid pipe, the hermetically sealing method comprising:
   a step that presses, against the bored opening, a hermetically sealing device that includes a sealing main-body, and a rubber seal that is adhered to the sealing main-body and includes an inner lip and an outer lip, to insert the inner lip that includes an outer-circumference surface that extends forward and inclines toward an inner-circumference side into the bored opening, to make an outer-surface-side edge of the bored opening enter a slit formed between the inner lip and the outer lip, and to make the outer lip transform in such a manner that the outer lip extends toward an outer-circumference side to be hermetically in contact with an outer surface of a periphery of the bored opening.

8. The hermetically sealing method according to claim 7, wherein the inner lip is made to cover a whole end surface of the bored opening.

* * * * *